(12) United States Patent
Ohashi et al.

(10) Patent No.: US 7,417,167 B2
(45) Date of Patent: Aug. 26, 2008

(54) PROCESS FOR PRODUCING CARBONYL DIFLUORIDE

(75) Inventors: Mitsuya Ohashi, Yamaguchi (JP); Isamu Mori, Yamaguchi (JP)

(73) Assignee: Central Glass Company Limited, Ube-shi (JP)

( * ) Notice: Subject to any disclaimer, the term of this patent is extended or adjusted under 35 U.S.C. 154(b) by 908 days.

(21) Appl. No.: 10/289,443

(22) Filed: Nov. 7, 2002

(65) Prior Publication Data

US 2003/0095911 A1 May 22, 2003

(30) Foreign Application Priority Data

Nov. 16, 2001 (JP) .............. 2001-350988

(51) Int. Cl.
*C01B 31/28* (2006.01)
(52) U.S. Cl. ...................... 562/848; 423/416
(58) Field of Classification Search .............. 562/847, 562/848; 423/416, 489, 490
See application file for complete search history.

(56) References Cited

U.S. PATENT DOCUMENTS 3,929,973 A * 12/1975 Dell'Amico et al. ........ 423/417

4,260,561 A    4/1981  Franz .......................... 562/813

FOREIGN PATENT DOCUMENTS

JP       A-54158396      12/1979

OTHER PUBLICATIONS

Farlow et al., Carbonyl Fluoride, Chapter VIIA, *Inorganic Syntheses 6*, p. 155 (1960).
Agopovich et al., "Ozonolysis of Trifluoroethylene, 1,1-Difluoroethylene, and Perfluoroethylene. Epoxide and Ozonide Formation", *J. Amer. Chem. Soc.*, 102, pp. 7572-7574 (1980).
Simons et al., "The Preparation and Properties of Certain Trifluoromethyl Compounds", *J. Amer. Chem. Soc.*, 62, pp. 3477-3480 (1940).

* cited by examiner

*Primary Examiner*—Stuart Hendrickson
(74) *Attorney, Agent, or Firm*—Crowell & Moring LLP

(57) ABSTRACT

The invention relates to a process for producing carbonyl difluoride. This process includes the steps of (a) reacting carbon monoxide with a first metal fluoride in a reactor, thereby obtaining carbonyl difluoride and a second metal fluoride having in the molecule a fluorine atom number less than that of the first metal fluoride; and (b) reacting the second metal fluoride with fluorine in the reactor, thereby obtaining the first metal fluoride. The steps (a) and (b) are alternately repeated in the reactor, thereby repeatedly producing carbonyl difluoride.

34 Claims, No Drawings

PROCESS FOR PRODUCING CARBONYL DIFLUORIDE

BACKGROUND OF THE INVENTION

The present invention relates to a process for producing carbonyl difluoride ($COF_2$), which is useful as a reagent in organic syntheses and as cleaning gas and etching gas for semiconductor producing apparatuses.

The synthesis of $COF_2$ can be classified into (a) a first process in which carbonyl dichloride (phosgene) is reacted with a suitable fluorination agent (e.g., hydrogen fluoride, antimony trifluoride, arsenic trifluoride, and sodium fluoride), thereby conducting a halogen exchange between chlorine atom and fluorine atom, and (b) a second process in which carbon monoxide is reacted with a suitable fluorination agent (e.g., fluorine and silver difluoride). Japanese Patent Unexamined Publication JP-A-54-158396, corresponding to U.S. Pat. No. 4,260,561, discloses a process for producing carbonyl difluoride by reacting phosgene with hydrogen fluoride in the presence of acetonitrile.

The first process has a problem of using phosgene, which is a highly toxic substance. Furthermore, the $COF_2$ synthesized by the first process may contain impurities of (a) carbonyl fluorochloride derived from chlorine and (b) carbon dioxide derived from water, for example, of the fluorination agent. It is difficult to remove these impurities from the $COF_2$.

The second process can be conducted by reacting carbon monoxide with fluorine. This reaction may, however, occur explosively. Furthermore, the obtained carbonyl difluoride may be low in purity due to its containment of carbon tetrafluoride and other impurities caused by heat of the reaction.

It is possible to relatively safely synthesize $COF_2$ with high purity by reacting carbon monoxide with silver difluoride. With this reaction, however, yield may be in a range of 70-85%, and the resulting carbonyl difluoride may contain carbon dioxide as an impurity, as described in Inorg. Synth., 6, 155 (1960). Furthermore, silver difluoride is extremely high in reactivity. Therefore, it decomposes by a reaction, for example, with water in the air and thereby turns into silver monofluoride. Thus, a substantial amount of silver difluoride turns into silver monofluoride by putting silver difluoride into a reactor in the air, thereby lowering yield. Furthermore, silver difluoride is high in water absorbent property. Thus, silver difluoride tends to absorb water upon putting silver difluoride into a reactor in the air. This absorbed water tends to cause hydrolysis of carbonyl difluoride to form carbon dioxide and hydrogen fluoride, thereby lowering the target compound (carbonyl difluoride) in purity and yield.

J. Amer. Chem. Soc., 102, 7572-7574 (1980) discloses a reaction of fluoroethane with ozone to produce carbonyl fluoride. J. Amer. Chem. Soc., 62, 3477 (1940) discloses a process for producing carbonyl fluoride using an equilibrium reaction between carbon monoxide and carbon tetrafluoride. These two reactions may be low in yield and purity and therefore may not be suitable for industrial processes for producing carbonyl difluoride.

SUMMARY OF THE INVENTION

It is therefore an object of the present invention to provide a process for producing carbonyl difluoride with high safety, high purity, high yield and high productivity.

According to the present invention, there is provided a process for producing carbonyl difluoride. This process comprises the steps of:

(a) reacting carbon monoxide with a first metal fluoride in a reactor, thereby obtaining carbonyl difluoride and a second metal fluoride having in the molecule a fluorine atom number less than that of the first metal fluoride; and (b) reacting the second metal fluoride with fluorine in the reactor, thereby turning the second metal fluoride into the first metal fluoride, wherein the steps (a) and (b) are alternately repeated in the reactor, thereby repeatedly producing carbonyl difluoride.

DESCRIPTION OF THE PREFERRED EMBODIMENTS

According to the present invention, the first and second metal fluorides are not taken out of the reactor, but are always kept in the reactor. Therefore, it is easily possible to prevent contact of the first and second metal fluorides with the air. With this, it is possible to produce carbonyl difluoride with high purity and high yield. Furthermore, it is possible to use cobalt trifluoride or cerium tetrafluoride as the first metal fluoride. With this, it becomes possible to reduce the effect of moisture in the air, thereby particularly improving carbonyl difluoride in purity and yield. Furthermore, it becomes possible to conduct the steps (a) and (b) at the same temperature by using cobalt trifluoride or cerium tetrafluoride as the first metal fluoride. With this, it is not necessary to alternately increase and decrease the temperature for repeatedly conducting the cycle of the steps (a) and (b), thereby improving productivity.

Examples of the first metal fluoride include cobalt trifluoride ($CoF_3$), cerium tetrafluoride ($CeF_4$), silver difluoride ($AgF_2$), manganese trifluoride ($MnF_3$), copper difluoride ($CuF_2$), lead tetrafluoride ($PbF_4$), tin tetrafluoride ($SnF_4$), and $K_3NiF_7$. Other compounds can also be used as the first metal fluoride, as long as the reactions of carbon monoxide with them occur spontaneously and as long as the second metal fluorides formed by the reaction with carbon monoxide can turn or regenerate into the first metal fluorides by the reaction with fluorine. As mentioned above, cobalt trifluoride and cerium tetrafluoride can particularly preferably be used as the first metal fluoride.

In the invention, the reaction temperature for conducting the steps (a) and (b) can suitably be selected depending on the type of the first metal fluoride. If the reaction temperature of the step (a) exceeds 300° C., the formation of carbon tetrafluoride and carbon dioxide as by-products may become notable to lower the target product (carbonyl difluoride) in purity and yield. In case that cobalt trifluoride is used as the first metal fluoride, the reaction rate of the step (a) may become too low with a reaction temperature lower than 100° C. Therefore, the reaction temperature of the step (a) is preferably in a range of 100-300° C., more preferably 150-300° C., in the case of cobalt trifluoride. In case that cerium tetrafluoride is used as the first metal fluoride, the reaction rate of the step (a) may become too low with a reaction temperature lower than 150° C. Therefore, the reaction temperature of the step (a) is preferably in a range of 150-300° C., more preferably 200-300° C., in the case of cerium tetrafluoride.

Cobalt trifluoride and cerium tetrafluoride (the first metal fluorides) turn by the step (a) of their reactions with carbon monoxide into cobalt difluoride and cerium trifluoride (the second metal fluorides), respectively. These cobalt difluoride and cerium trifluoride can turn or regenerate by the step (b) of their reactions with fluorine into the original cobalt trifluoride and cerium tetrafluoride, respectively.

The reaction temperature of the step (b) is preferably in a range of 100-300° C. in the case that the second metal fluoride is cobalt difluoride. In contrast, it is preferably in a range of 150-300° C. in case that the second metal fluoride is cerium trifluoride. It is possible to conduct the steps (a) and (b) at the same temperature. By alternately conducting the steps (a) and (b), it is possible to continue to produce $COF_2$ for a long time without taking the first and second metal fluorides out of the reaction system.

In the case of manganese trifluoride, copper difluoride, lead tetrafluoride and tin tetrafluoride, the temperature at which these compounds start to react with CO is 300° C. or higher, and yields are as low as 3-20%. Furthermore, $K_3NiF_7$ has a reaction activity higher than that of silver difluoride, and thus can be used as the first metal fluoride in a manner similar to silver difluoride.

The reactor usable in the invention is not particularly limited as long as it has a structure capable of heating. The reactor may be made of a material resistant to high-temperature fluorine, such as nickel, nickel-based heat resistant alloy, copper and platinum. The steps (a) and (b) may be conducted by a batch operation or a continuous operation in which CO is continuously introduced into the reactor and $COF_2$ is continuously removed from the reactor. Furthermore, the steps (a) and (b) may be conducted by using a fluidized bed (which is effective for taking heat out of the reactor), since both reactions of the steps (a) and (b) are exothermic reactions.

It is preferable to conduct a fluorination treatment on the first metal fluoride in the reactor, prior to conducting the step (a) for the first time, at which the first metal fluoride is firstly reacted with carbon monoxide. At the time when the first metal fluoride has been put into the reactor prior to conducting the step (a) for the first time, the first metal fluoride inevitably contains some amounts of absorbed water. In particular, a part of a highly reactive and highly fluorinated metal fluoride (e.g., silver difluoride) may be in the form of a low fluorinated metal fluoride (e.g., silver monofluoride) at such time. By conducting the fluorination treatment prior to the step (a), it is possible to remove the absorbed water from the first metal fluoride and to turn the low-fluorinated metal fluoride into the highly-fluorinated metal fluoride. Furthermore, it is preferable to treat the first metal fluoride with $COF_2$ after the fluorination treatment. With this, it is possible to completely remove water from the first metal fluoride. Therefore, it is possible to reduce the formation of carbon dioxide (i.e., an impurity that can be contained in the target product $COF_2$) in the step (a), thereby improving $COF_2$ in purity.

The following nonlimitative examples are illustrative of the present invention.

EXAMPLE 1

At first, a reactor was charged with 7.0 g of $CoF_3$, followed by increasing the temperature to 200° C. This reactor was equipped with a heater and made of nickel and had a volume of 800 ml and dimensions of $\phi$ 100 mm ×100 mm. The reactor was evacuated, and then CO was introduced to have a pressure of 144 kPa, followed by allowing the reactor to stand still for 2 hr. The reaction gas was collected in a 1-liter stainless steel trap (cooled by liquid nitrogen) for conducting a low temperature degassing. The collected gas was found by GC-MS and FT-IR to be $COF_2$ containing only 1.0 vol% $CO_2$ and 0.66 vol% HF as impurities. The purity was 98.3 vol%, and the yield was 93%.

EXAMPLE 2

Following the reaction of CO with $CoF_3$ in Example 1, the reactor was evacuated. Then, $F_2$ was introduced at 200° C. The introduced $F_2$ was absorbed in the reactor, and the time at which this absorption had stopped was judged as the time at which the regeneration of $CoF_2$ into $CoF_3$ was finished. Then, the atmosphere of the reactor was replaced with He. After that, CO was introduced again to have a pressure of 144 kPa, followed by standing still for 2 hr. Then, the reaction gas was collected in the trap in the same manner as that in Example 1. The thus collected gas was found by GC-MS and FT-IR to be $COF_2$ containing only 0.32 vol% $CO_2$ and 0.17 vol% HF as impurities. The purity was 99.5 vol%, and the yield was 98%.

EXAMPLE 3

At first, a reactor, which was the same as that of Example 1, was charged with 22 g of $CeF_4$, followed by increasing the temperature to 250° C. Then, the reactor was evacuated, and then CO was introduced to have a pressure of 144 kPa, followed by allowing the reactor to stand still for 2 hr. The reaction gas was collected in the same manner as that of Example 1. The collected gas was found by GC-MS and FT-IR to be $COF_2$ containing only 1.8 vol% $CO_2$ and 1.1 vol% HF as impurities. The purity was 97.1 vol%, and the yield was 92%.

EXAMPLE 4

Following the reaction of CO with $CeF_4$ in Example 3, the reactor was evacuated. Then, $F_2$ was introduced at 250° C. The introduced $F_2$ was absorbed in the reactor, and the time at which this absorption had stopped was judged as the time at which the regeneration of $CeF_3$ into $CeF_4$ was finished. Then, the atmosphere of the reactor was replaced with He. After that, CO was introduced again to have a pressure of 144 kPa, followed by standing still for 2 hr. Then, the reaction gas was collected in the trap in the same manner as that in Example 1. The thus collected gas was found by GC-MS and FT-IR to be $COF_2$ containing only 0.45 vol% $CO_2$ and 0.23 vol% HF as impurities. The purity was 99.3 vol%, and the yield was 97%.

COMPARATIVE EXAMPLE 1

At first, a reactor, which was the same as that of Example 1, was charged with 8.8 g of $AgF_2$. Then, the reactor was evacuated, and then CO was introduced at room temperature to have a pressure of 144 kPa, followed by allowing the reactor to stand still for 2 hr. The reaction gas was collected in the same manner as that of Example 1. The collected gas was found by GC-MS and FT-IR to be $COF_2$ containing 5.3 vol% $CO_2$ and 6.7 vol% HF as impurities. The purity was 88.0 vol%, and the yield was 75%.

EXAMPLE 5

Following the reaction of CO with $AgF_2$ in Comparative Example 1, the reactor was evacuated, followed by increasing the temperature to 200° C. and then introducing $F_2$ at this temperature. The introduced $F_2$ was absorbed in the reactor, and the time at which this absorption had stopped was judged as the time at which the regeneration of AgF into $AgF_2$ was finished. Then, the atmosphere of the reactor was replaced with He, followed by lowering the temperature to room temperature. After that, CO was introduced again to have a pressure of 144 kPa, followed by standing still for 2 hr. Then, the reaction gas was collected in the trap in the same manner as that in Example 1. The thus collected gas was found by GC-MS and FT-IR to be $COF_2$ containing only 0.51 vol% $CO_2$ and 0.25 vol% HF as impurities. The purity was 99.2 vol%, and the yield was 98%.

It is understood from Examples 1-5 and Comparative Example 1 that it is possible to improve purity and yield of the target product ($COF_2$) by using the first metal fluoride (prepared by the regeneration with $F_2$ in the same reactor) in the step (a) (see Examples 2, 4 and 5), as compared with those of Examples 1 and 3 and Comparative Example 1, in which the step (a) was conducted by using the first metal fluoride prior to any regeneration of the step (b). In particular, the improvement caused by the regeneration becomes notable in the case of $AgF_2$, which is highly reactive.

In the case of $CoF_3$ and $CeF_4$, it is possible to conduct the steps (a) and (b) at the same temperature. Therefore, it is not necessary to alternately increase and decrease the reaction temperature for conducting the steps (a) and (b). This improves the productivity.

In the case of $AgF_2$, the optimum reaction temperatures for conducting the steps (a) and (b) are respectively about room temperature and about 200° C. Therefore, it is necessary to alternately increase and decrease the reaction temperature for conducting the steps (a) and (b). If the step (b) were conducted at room temperature, the reaction takes too much time due to slow reaction rate. If the step (a) were conducted at about 200° C., the reaction may proceed too rapidly.

EXAMPLES 6-8

In these examples, Example 2 was repeated except in that the reaction temperature for conducting the steps (a) and (b) was changed as shown in Table. In Example 8, the reaction of the step (a) did not occur at all in 2 hr.

EXAMPLES 9-11

In these examples, Example 4 was repeated except in that the reaction temperature for conducting the steps (a) and (b) was changed as shown in Table. In Example 11, the reaction of the step (a) did not occur at all in 2 hr.

TABLE

|  | First Metal Fluoride | Reaction Temp. of Steps (a) & (b) | Yield (%) | $COF_2$ (vol %) | $CO_2$ (vol %) | HF (vol %) | $CF_4$ (vol %) |
|---|---|---|---|---|---|---|---|
| Ex. 2 | $CoF_3$ | 200 | 98 | 99.5 | 0.32 | 0.17 | — |
| Ex. 6 | $CoF_3$ | 100 | 9 | 99.4 | 0.34 | 0.19 | — |
| Ex. 7 | $CoF_3$ | 300 | 97 | 97.4 | 1.35 | 0.28 | 0.9 |
| Ex. 8 | $CoF_3$ | 25 | 0 | — | — | — | — |
| Ex. 4 | $CeF_4$ | 250 | 97 | 99.3 | 0.45 | 0.23 | — |
| Ex. 9 | $CeF_4$ | 150 | 6 | 99.4 | 0.41 | 0.21 | — |
| Ex. 10 | $CeF_4$ | 350 | 95 | 96.2 | 1.56 | 0.45 | 1.7 |
| Ex. 11 | $CeF_4$ | 25 | 0 | — | — | — | — |

The entire contents of Japanese Patent Application No. 2001-350988 filed on Nov. 16, 2001, of which priority is claimed in the present application, are incorporated herein by reference.

What is claimed is:

1. A process for producing carbonyl difluoride, comprising the steps of:
   (a) reacting carbon monoxide with a first metal fluoride in a reactor, thereby obtaining carbonyl difluoride and a second metal fluoride having in the molecule a fluorine atom number less than that of the first metal fluoride; and
   (b) reacting the second metal fluoride with fluorine in the reactor, thereby turning the second metal fluoride into the first metal fluoride,
   wherein the steps (a) and (b) are alternately repeated in the reactor, while the first metal fluoride is prevented from contacting air during the step (a), and the second metal fluoride is prevented from contacting air during the step (b), thereby repeatedly producing carbonyl difluoride.

2. A process for producing carbonyl difluoride, comprising the steps of:
   (a) reacting carbon monoxide with a first metal fluoride in a reactor, thereby obtaining carbonyl difluoride and a second metal fluoride having in the molecule a fluorine atom number less than that of the first metal fluoride; and
   (b) reacting the second metal fluoride with fluorine in the reactor, thereby turning the second metal fluoride into the first metal fluoride,
   wherein the first metal fluoride is cobalt trifluoride or cerium tetrafluoride and the steps (a) and (b) are alternately repeated in the reactor, thereby repeatedly producing carbonyl difluoride.

3. A process according to claim 2, wherein the second metal fluoride is cobalt difluoride or cerium trifluoride.

4. A process according to claim 1, wherein the first metal fluoride is selected from the group consisting of cobalt trifluoride, cerium tetrafluoride, silver difluoride, manganese trifluoride, copper difluoride, lead tetrafluoride, tin tetrafluoride, and $K_3NiF_7$.

5. A process according to claim 2, wherein, when the first metal fluoride is cobalt trifluoride, the step (a) is conducted at a temperature of 100-300° C.

6. A process according to claim 5, wherein the temperature is from 150° C. to 300° C.

7. A process according to claim 2, wherein, when the first metal fluoride is cobalt trifluoride, the step (b) is conducted at a temperature of 100-300° C.

8. A process according to claim 2, wherein, when the first metal fluoride is cerium tetrafluoride, the step (a) is conducted at a temperature of 150-300° C.

9. A process according to claim 8, wherein the temperature is from 200° C. to 300° C.

10. A process according to claim 2, wherein, when the first metal fluoride is cerium tetrafluoride, the step (b) is conducted at a temperature of 150-300° C.

11. A process according to claim 1, wherein, prior to the step (a), the first metal fluoride is fluorinated by fluorine.

12. A process according to claim 1, wherein, between the steps (a) and (b), the carbonyl difluoride is removed from the reactor.

13. A process for producing carbonyl difluoride, comprising the steps of:
   (a) reacting carbon monoxide with a first metal fluoride in a reactor, thereby obtaining carbonyl difluoride and a second metal fluoride having in the molecule a fluorine atom number less than that of the first metal fluoride;
(b) reacting the second metal fluoride with fluorine in the reactor, thereby turning the second metal fluoride into the first metal fluoride; and
(c) reacting in the reactor carbon monoxide with the first metal fluoride obtained by the step (b), thereby obtaining carbonyl difluoride and the second metal fluoride,
wherein the first metal fluoride is prevented from contacting air during each of the steps (a) and (c), and the second metal fluoride is prevented from contacting air during the step (b).

14. A process for producing carbonyl difluoride, comprising the steps of:
(a) reacting carbon monoxide with cobalt trifluoride or cerium tetrafluoride in a reactor, thereby obtaining carbonyl difluoride and a second metal fluoride having in the molecule a fluorine atom number less than that of cobalt trifluoride or cerium tetrafluoride;
(b) reacting the second metal fluoride with fluorine in the reactor, thereby turning the second metal fluoride into cobalt trifluoride or cerium tetrafluoride; and
(c) reacting in the reactor carbon monoxide with the cobalt trifluoride or cerium tetrafluoride obtained by step (b), thereby obtaining carbonyl difluoride and the second metal fluoride.

15. A process according to claim 14, wherein, when the first metal fluoride is cobalt trifluoride, the step (a) is conducted at a temperature of 100-300° C.

16. A process according to claim 14, wherein, when the first metal fluoride is cobalt trifluoride, the step (b) is conducted at a temperature of 100-300° C.

17. A process according to claim 14, wherein, when the first metal fluoride is cerium tetrafluoride, the step (a) is conducted at a temperature of 150-300° C.

18. A process according to claim 14, wherein, when the first metal fluoride is cerium tetrafluoride, the step (b) is conducted at a temperature of 150-300° C.

19. A process according to claim 13, wherein, prior to the step (a), the first metal fluoride is fluorinated by fluorine.

20. A process according to claim 13, wherein, between the steps (a) and (b), the carbonyl difluoride is removed from the reactor.

21. A process according to claim 2, wherein, prior to the step (a), the first metal fluoride is fluorinated by fluorine.

22. A process according to claim 2, wherein, between the steps (a) and (b), the carbonyl difluoride is removed from the reactor.

23. A process according to claim 2, wherein the first and second metal fluorides are respectively prevented during the steps (a) and (b) from contacting with air.

24. A process according to claim 14, wherein, prior to the step (a), the first metal fluoride is fluorinated by fluorine.

25. A process according to claim 14, wherein, between the steps (a) and (b), the carbonyl difluoride is removed from the reactor.

26. A process according to claim 14, wherein the cobalt trifluoride or cerium tetrafluoride is prevented from contacting with air during each of the steps (a) and (c), and wherein the second metal fluoride is prevented from contacting with air during the step (b).

27. A process for producing carbonyl difluoride, comprising the steps of:
(a) reacting carbon monoxide with a first metal fluoride in a reactor, thereby obtaining carbonyl difluoride and a second metal fluoride having in the molecule a fluorine atom number less than that of the first metal fluoride; and
(b) reacting the second metal fluoride with fluorine in the reactor, thereby turning the second metal fluoride into the first metal fluoride,
wherein the steps (a) and (b) are alternately repeated in the reactor, thereby repeatedly producing carbonyl difluoride,
wherein the first metal fluoride is selected from the group consisting of manganese trifluoride, copper difluoride, lead tetrafluoride, tin tetrafluoride, and $K_3NiF_7$.

28. A process according to claim 27, wherein, prior to the step (a), the first metal fluoride is fluorinated by fluorine.

29. A process according to claim 27, wherein, between the steps (a) and (b), the carbonyl difluoride is removed from the reactor.

30. A process according to claim 27, wherein the first and second metal fluorides are respectively prevented during the steps (a) and (b) from contacting with air.

31. A process for producing carbonyl difluoride, comprising the steps of:
(a) reacting carbon monoxide with a first metal fluoride in a reactor, thereby obtaining carbonyl difluoride and a second metal fluoride having in the molecule a fluorine atom number less than that of the first metal fluoride;
(b) reacting the second metal fluoride with fluorine in the reactor, thereby turning the second metal fluoride into the first metal fluoride; and
(c) reacting in the reactor carbon monoxide with the first metal fluoride obtained by the step (b), thereby obtaining carbonyl difluoride and the second metal fluoride,
wherein the first metal fluoride is selected from the group consisting of manganese trifluoride, copper difluoride, lead tetrafluoride, tin tetrafluoride, and $K_3NiF_7$.

32. A process according to claim 31, wherein, prior to the step (a), the first metal fluoride is fluorinated by fluorine.

33. A process according to claim 31, wherein, between the steps (a) and (b), the carbonyl difluoride is removed from the reactor.

34. A process according to claim 31, wherein the first metal fluoride is prevented from contacting with air during each of the steps (a) and (c), and wherein the second metal fluoride is prevented from contacting with air during the step (b).

* * * * *